Oct. 29, 1968

E. A. GLASSEY 3,407,664

APPARATUS FOR MANOMETER TEMPERATURE CONTROL AND
TEMPERATURE COMPENSATION CIRCUIT AND METHOD

Filed Dec. 27, 1966

INVENTOR.
EUGENE A. GLASSEY
BY
PATENT ATTORNEY

United States Patent Office 3,407,664
Patented Oct. 29, 1968

3,407,664
APPARATUS FOR MANOMETER TEMPERATURE CONTROL AND TEMPERATURE COMPENSATION CIRCUIT AND METHOD
Eugene A. Glassey, Los Altos, Calif. (% Exactel Instrument Co., 89 Alice Ave., Mountain View, Calif. 94041)
Filed Dec. 27, 1966, Ser. No. 604,780
8 Claims. (Cl. 73—401)

ABSTRACT OF THE DISCLOSURE

Resistance heating of manometers having metal tubes to prevent freezing of water and other liquids is accomplished by passing an electric current through the conductive tubes of the manometer itself. Temperature compensation of the manometer reading obtained in accordance with applicant's prior patents is accomplished by adding an alternating electric voltage which is derived from a temperature sensor to the subtractive electrical series output of a pair of differential transformers which are excited by change in the mercury level within the manometer tubes at approximately 90° phase shift. The resultant output is used to drive a servo-motor which centers the DT's at the new tube levels and provides a data readout. The instrument has an order of accuracy corresponding to primary and/or secondary standards to meet general existent needs in the "practical" channels of industry and technology.

---

Reference is made to applicant's Patent 3,043,144 and to co-pending application Ser. No. 450,897 filed Apr. 26, 1965 now Patent No. 3,323,368.

The present invention has particular use in a manometer wherein one or both legs are connected by conduit to freezable liquids. For example, in measuring flow through a water line, it is a common practice to install an orifice plate or venturi-type of flow orifice in the line and to measure the difference in pressure on opposite sides of the plate or venturi by means of a manometer. Thus waterfilled conduits lead from the water line to the tops of the legs of the manometer. The water establishes an interface with the mercury in the tubes. The relative heights of the mercury columns in the two tubes measures the differential in pressure and flow. A manometer construction with which the present invention may be used is that shown in the above-identified application Ser. No. 450,897, it being understood that a variety of other manometer constructions may be used.

The present invention provides means to prevent freezing the water in cold weather. Resistance heating is employed for such purpose and the metal manometer tubes themselves are used to provide the resistance. Accordingly, external heating coils or heating of the manometer cabinet as by a space heater are eliminated, resulting in more uniform temperature and heat distribution, with added economies and reliability of components.

A feature and advantage of the present invention is the fact that although the tubes of the manometer are used as the heating elements, nevertheless the accuracy of the output of the differential transformers which surround the tubes and are used to measure the mercury height is not affected.

A modification of the basic invention involves the lining of the manometer tube with an electrical insulating material such as Teflon to prevent a portion of the current intended to pass through the tubes and provide heating from being shunted or by-passed through the mercury causing the mercury to be at a somewhat different temperature than the tube. Hence, a more uniform and determinate temperature relationship is established in this modification.

The basic idea of the present invention has further application in thermostatic control of the mercury temperature in precision manometers of the general type employed as calibration standards. Further application of the basic principle is to heat manometer tubes to a high temperature such as 1000° F. to evaporate moisture and impurities while drawing a vacuum on the system. This method is adapted to cleaning manometer tubes following drainage of the manometer liquid, but without the necessity of removing them from the instrument.

In another phase of the invention, temperature compensation is accomplished with simplification and improvement of the means shown in Patent 3,043,144. Thus, a sensor is placed in contact with the mercury in one of the tubes and its electrical output is shifted approximately 90° in phase and fed into the subtractive output of the two differential transformers on the respective manometer tubes. The output of the temperature sensor is at a low level approximating the magnitude and phase of the differential transformer outputs. This output is added to the differential transformer output, fed into a servo-amplifier and used to drive a servo-motor which in turn moves the differential transformers to be electrically balanced relative to the floats in their respective liquid columns in a manner similar to that disclosed in application Ser. No. 450,897.

Another feature of the invention is that the temperature sensor used in the foregoing described circuit may also be used to control the application of heat to the tubes heretofore described.

Other objects of the present invention will become apparent upon reading the following specification and referring to the accompanying drawings in which similar characters of reference represent corresponding parts in each of the several views.

Figures 1, 2, 2A:
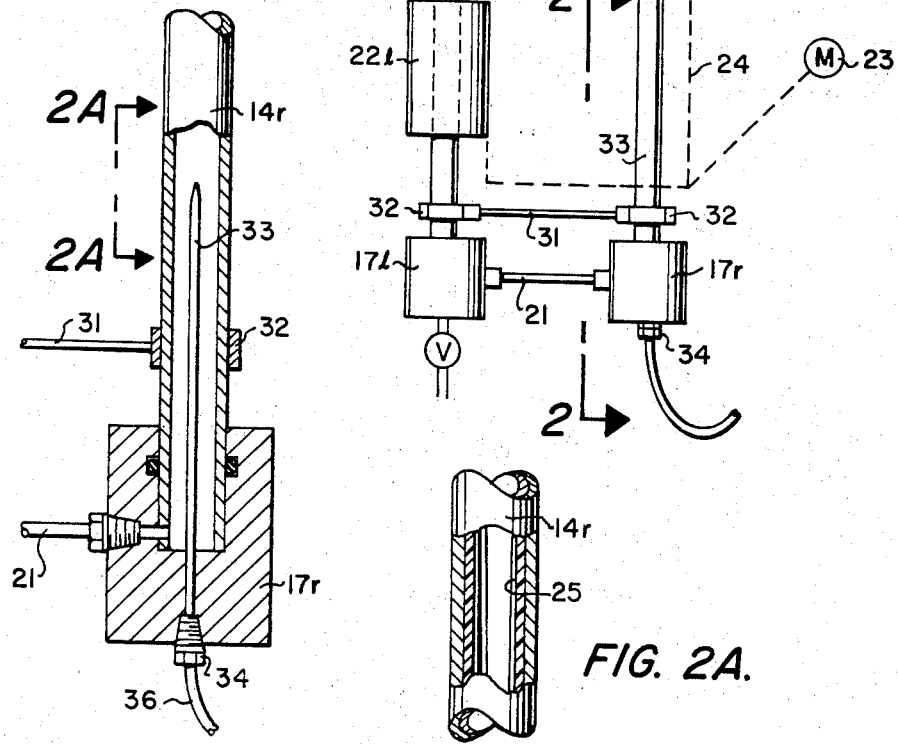
FIG. 1 is a schematic elevation, partly broken away in section, showing a manometer used to measure flow through a water line and wherein current is passed through the metal tubes of the manometer to heat the same and prevent freezing of the water in the conduit interconnecting the line with the manometer tubes.
FIG. 2 is an enlarged fragmentary sectional view taken substantially along the line 2—2 of FIG. 1.
FIG. 2A is a modification of the structure of FIG. 2.

FIG. 1 shows a typical application of the present invention. Water or other freezable liquid flows through a line 11 past an orifice plate 12. The pressure drop measured on opposite sides of orifice plate 12 is a function of the velocity and hence of the flow. A manometer 13 is conventionally used to measure the difference in pressure. FIG. 1 illustrates very schematically the manometer which is shown in detail in Ser. No. 450,897. Stainless steel tubes 14L, 14R are vertically disposed and provided with fittings 16, 17 at top and bottom, respectively. Fittings 16 are preferably disposed immediately below line 11 and are connected by short conduits 18 to holes 19 on opposite sides of plate 12. Bottom fittings 17 are interconnected by a horizontal leg 21. In customary terminology, manometer legs 14L, 14R and bottom leg 21 comprise a U tube. Mercury or other suitable liquid is used to partially fill legs 14L, 14R and the fluid passing through line 11 (here assumed to be water) establishes an interface with the top of the mercury column in each of the tubes extending up to the line 11. The column heights in the tubes 14L, 14R vary depending upon the pressure difference. The mercury columns are provided with floats carrying magnetic armatures 39L, 39R to which the differential transformers 22L, 22R respond. A servo-motor 23 actuates a mechanical drive indicated generally by reference numeral 24 to electrically center the two transformers 22L, 22R relative to their respective columns, all as explained in said application Ser. No. 450,897, and it further being understood that other means may be used to accomplish this general result. At low ambient temperatures, the liquid in conduits 18 may freeze, and one of the principal purposes of the present invention is to provide a heating means for preventing freezing. In this connection the tubes 14L, 14R are of a conductive and electrically resistive material such as stainless steel. In one form of the invention the tubes may be lined with a non-conductive liner 25 (see FIG. 2A) of a material such as Teflon to prevent the mercury from conducting the current.

A transformer 26 is provided preferably having a thermostatic switch 27 or other control in its primary which is sensitive to the temperature of the liquid or the mercury in tubes 14. The output of the secondary of transformer 26 is used to heat the tubes 14L, 14R and for such purpose the leads 28 are connected to clamps 29 clamped to the upper ends of tubes 14L, 14R and thus the tubes become conductors. Preferably a shunt 31 connects the bottoms of the tubes and is clamped thereto by clamps 32.

In a practical example of the present invention, the primary of transformer 26 receives a 60-cycle 115-volt current and the transformer 26 steps this down to 1.5 volts which is used to pass approximately 100 amp. through the tubes of a 40-inch range U-tube having ¾" I.D. and ⅛ inch wall. Approximately 150-watt power input serves to raise the tube temperature approximately 75° F. in a period of approximately 40 minutes. This amount of heat is adequate to meet applications even under the most adverse climatic conditions to which instruments of this type are generally subjected. However, the amount of power employed could be varied within wide limits to meet lower or higher requirements. For example, the tubes may be heated to the range of 400° to 1000° F. while drawing a vacuum on the system to evaporate most common impurities and clean the tubes preparatory to filling the same with mercury or preparatory to installing the tubes in a line 11.

The thermostatic switch 27 may be placed in heat conductive relationship to either tube 14 or conduit 18, or may be controlled by a temperature sensor 33 installed through a fitting 34 in the bottom of one of the fittings 17, the probe of sensor 33 extending up into the tube 14R and sensing the temperature of the mercury therein.

The tube heating system is designed so that even though the excitation frequency for the differential transformers is the same as that used to heat the tubes, negligible electrical interference results. The current which passes through the tubes 14 does not affect the accuracy of the output of the differential transformers 22. Differential transformers have a low efficiency of coupling between the primary and the two secondary windings because of the large air gap and small size of the armature located inside the tube. This relationship results in a low power factor generally of less than 1%, and corresponds to an electrical phase shift of the output voltage of the differential transformer of about 89° with respect to the phase of the voltage and current in both the manometer tubes and in the primary of the differential transformers. The servo follower responds to an output signal from the secondaries of the differential transformers which is 90° removed from the electrical phase of the power line supplying the system. The electrical loads made up of the primary of the differential transformers and the manometer tubes are almost purely resistive in nature. Therefore, the voltage and current in these elements are all of like phase and about 89° removed from the error signal output of the differential transformers. As a result, the servo follower is virtually insensitive to the high current in the tube except for the approximately 1° of in-phase component remaining and stray magnetic fields, fringing, etc. Moreover, the effects of the remaining coupling, fields, etc., is further made almost non-existent by the fact that the two secondary windings of the differential transformers are wound in subtractive series which effectively cancels the remaining interference. The direction of current used for heating of the tube is at any given instant coaxial to the axis of the body of the differential transformer and the electrical field generated by this current would, therefore, be in a direction to encircle the tube and thus be parallel to the windings of the transformers, thereby producing no coupling except as may be caused by imperfect geometry.

Figure 3:
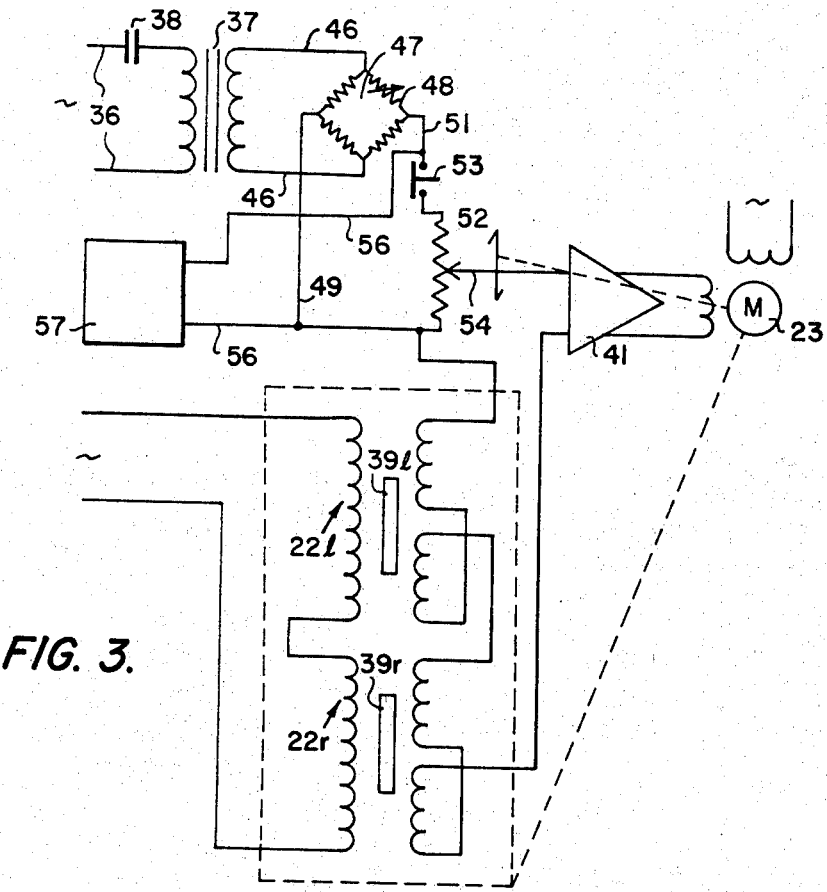
FIG. 3 is a wiring diagram showing the output of a temperature sensor fed into the output of the differential transformers to control the servo-motor.

It is desirable to provide temperature compensation for manometers, one means of such compensation being shown in Patent 3,043,144. However, the present invention provides a convenient means for temperature compensation using the probe 33 heretofore mentioned. The leads 36 from probe 33 are connected to the primary of a transformer 37 shown in FIG. 3 with a phase shift capacitor 38 installed, as shown. Assuming the voltage in leads 33 is 115 volts and capacitor 38 is of very low value of nominally 50 micro-microfarads, an approximately 89° phase shift is accomplished, using a rated 32 volt secondary of the transformer 37 there is provided a low level output which approximates the magnitude and phase of the differential transformer outputs of transformers 22. Transformers 22L, 22R are also shown in FIG. 3 as are their armatures 39L, 39R which float upon the mercury columns in the respective tubes. The output of coils of transformers 22L, 22R are wound in subtractive series and fed into the amplifier 41 which in turn drives servo-motor 23. Temperature compensation is accomplished in the following manner:

The leads 46 of the secondary of transformer 37 are connected to a Wheatstone resistance bridge 47, one side 48 of which is of variable resistance. The opposite sides of bridge 47 are connected by leads 49, 51 to a potentiometer 52. A switch 53 is imposed in lead 51 to check the effect of the temperature compensation from time to time. Potentiometer 52 has a movable contact 54 which is dependent upon column height and is driven by the motor 23, as well understood in this art. Accordingly, the output of the sensor 33 is imposed upon the output of the differential transformers 22 and fed into the servo-amplifier 41 to control the servo-motor 23.

Figure 4:
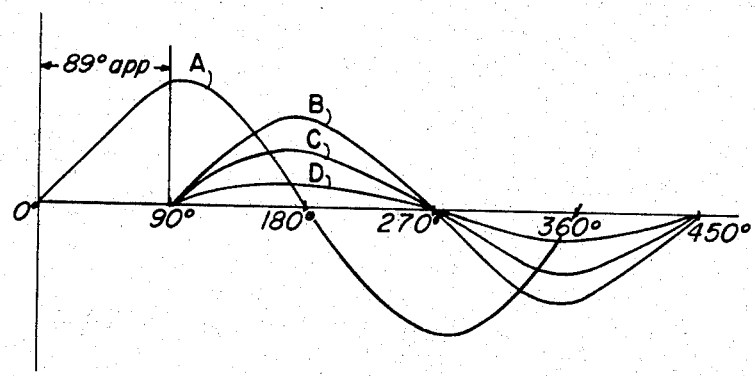
FIG. 4 is a graph showing the error voltage seen by the servo-amplifier from the temperature detector and from the differential transformers at three magnitudes of displacement.

Turning to FIG. 4, the curve A represents line power current and voltage which is also in phase with the current and voltage in the primary of the differential transformers and the current and voltage used to heat the tubes. The curves B, C, D represent the output voltage of the differential transformers at three different magnitudes of displacement. These curves represent the error voltage seen by the servo-amplifier 41. It is observed that the curves B, C and D are nulled to zero at balance. Thus, as the servo-motor 23 brings the differential transformers into balance, the error voltage approaches zero.

Turning again to FIG. 3, leads 56 are connected to the output of bridge 47 and to a heat control 57 which may be used to replace the thermostatic switch 27 of FIG. 1. In other words, the sensor 33 may be used to accomplish the thermostatic control of the heat control by a circuit such as shown in FIG. 3.

The sensor 33 is subject to considerable variation and is a well known commercially available device such as that produced by the Thomas A. Edison Company.

What is claimed is:

1. In combination a line for a freezable first liquid, flow restricting means in said line creating a pressure drop on one side of said flow restricting means relative to the other, first and second conduits communicating with the interior of said line on opposite sides of said flow restricting means, a U-tube manometer having the upper ends of each of its legs communicating with said first and second conduits, said U-tube manometer partially filled with a second liquid, said manometer and said conduits filled with first liquid above said second liquid up to said line, said manometer and said conduits being electrically conductive or resistive, a source of electric power, leads from said source, lead attaching means securing said leads to points adjacent the upper ends of said manometer, whereby current from said source heats said manometer and both said conduits to deter freezing of both said liquids.

2. The combination of claim 1 which further comprises a sensor sensing the temperature of said tube and a switch actuated by said sensor to energize said leads dependent upon the temperature of said tube.

3. The combination of claim 1 in which said lead attaching means are located adjacent the upper ends of their respective tubes and which further comprises a shunt across the lower ends of said tubes.

4. The combination of claim 1 which further comprises a first and a second armature floating on top of the manometer liquid in said first mentioned first and second tubes, a first and a second differential transformer responsive to said first and second armatures respectively, said transformers wired in subtractive series and energizing a servo-motor, mechanical means driven by said motor to center said transformers electrically relative to their armatures and to read out the difference in relative positions of said armatures, a sensor sensing the temperature of the mercury in said tubes, and electrical means for imposing the signal of the output of said sensor upon the output of said transformers to compensate for temperature variations of said manometer liquid.

5. The combination of claim 4 in which said sensor and said differential transformers are energized from a common AC source, and in which said electrical means includes a capacitor shifting the phase of said sensor signal approximately 90° relative to the signals of said differential transformers.

6. In a manometer, first and second tubes and means interconnecting said tubes, liquid in said tubes, first and second armatures floating on the liquid in said first and second tubes, first and second differential transformers responsive to said first and second armatures and movable along said first and second tubes, a servo-motor, a mechanical drive driven by said motor and arranged to move said differential transformers in opposite directions in equal increments, the secondary windings of said differential transformers being arranged in subtractive series, a first electrical circuit receiving the output of said differential transformers, an amplifier controlling said servo-motor and receiving the output of said first electrical means, a sensor sensing the temperature of liquid in at least one said tube and emitting an electric signal of a voltage dependent on temperature, and a second electrical circuit imposing the output of said sensor upon said first electrical circuit to compensate the signal of said differential transformers for variation of temperature of said liquid.

7. A manometer according to claim 6 in which said second electrical circuit includes phase shifting means whereby the phase of the output of said sensor is shifted approximately 90° relative to the output of said differential transformers, said sensor and differential transformers energized from a common AC source.

8. The combination of claim 7 in which said second electrical circuit includes a bridge, one of the elements of said bridge being of variable resistance.

References Cited

UNITED STATES PATENTS

| | | | |
|---|---|---|---|
| 1,658,699 | 2/1928 | Weiss | 73—205 XR |
| 1,689,776 | 10/1928 | Dawley | 73—205 |
| 2,452,367 | 10/1948 | Gangloff | 138—33 XR |
| 3,043,144 | 7/1962 | Glassey | 73—401 |
| 3,323,368 | 6/1967 | Glassey | 73—401 |

OTHER REFERENCES

Ewing et al.: "Thawing Frozen Water Pipes with Electric Current," Bulletin No. 7, Engineering Extension Service, Purdue University, August 1924 (pp. 3–13 relied on).

S. CLEMENT SWISHER, *Primary Examiner.*

DONALD O. WOODIEL, *Assistant Examiner.*